Patented Apr. 24, 1923.

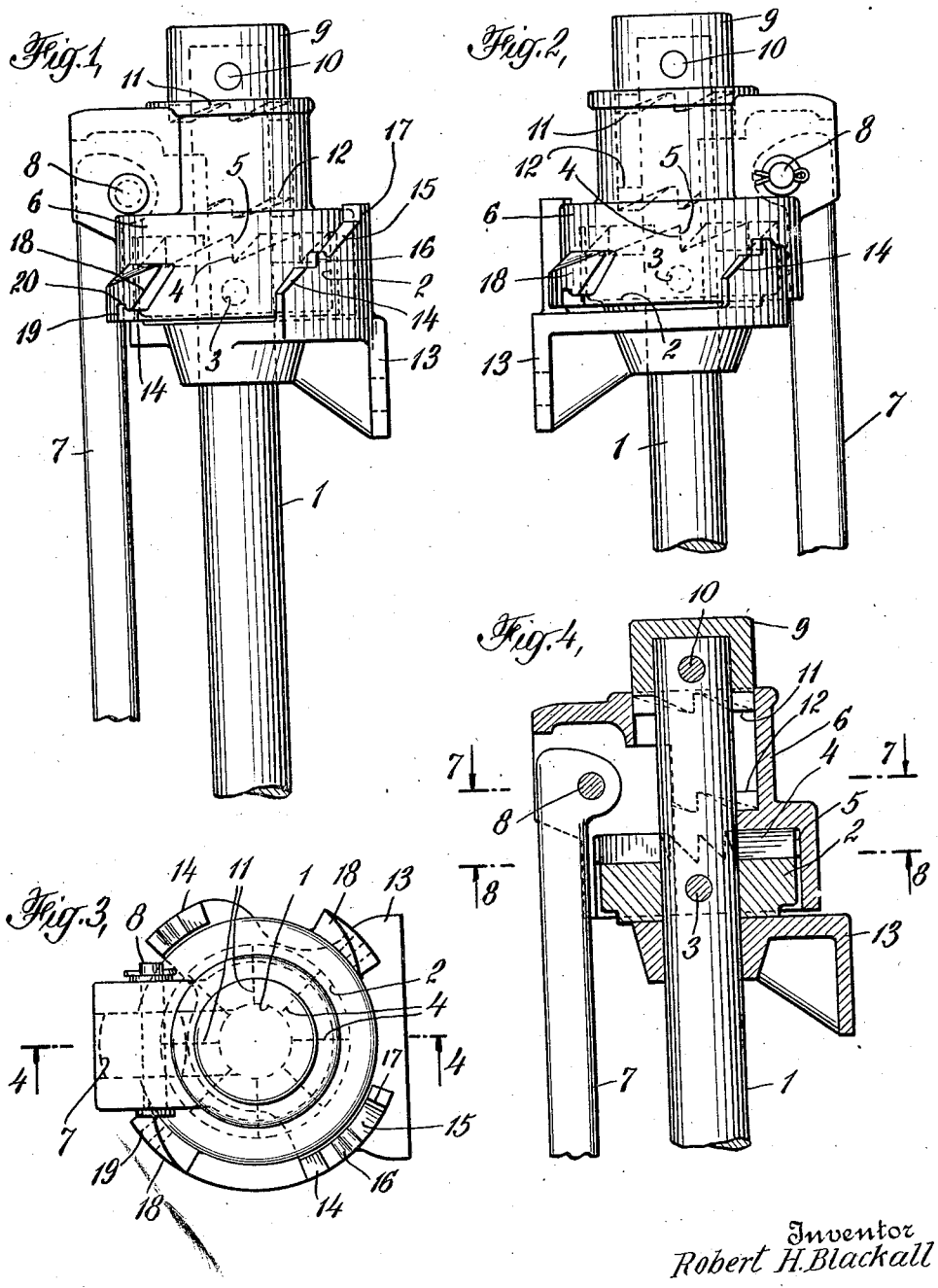
Apr. 24, 1923.
R. H. BLACKALL
RATCHET BRAKE MECHANISM
Filed May 5, 1922
1,452,784
2 Sheets-Sheet 1
Inventor
Robert H. Blackall
By his Attorneys

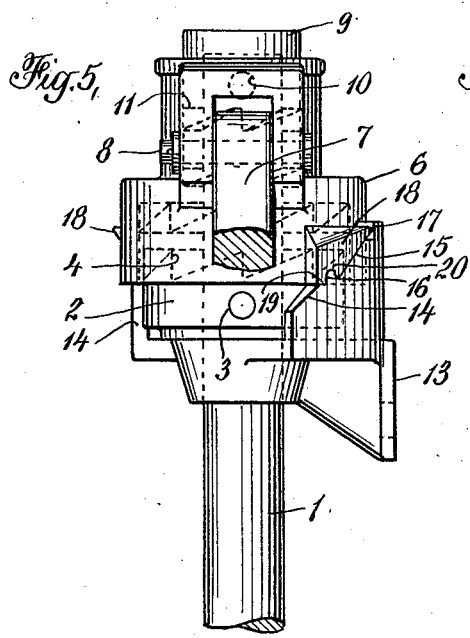
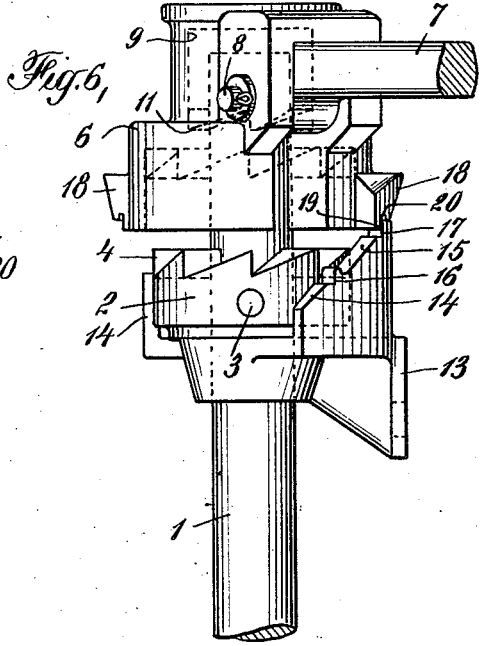
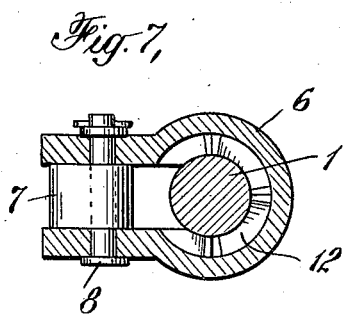
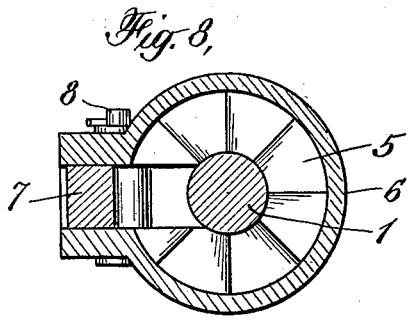

1,452,784

UNITED STATES PATENT OFFICE.

ROBERT H. BLACKALL, OF PITTSBURGH, PENNSYLVANIA, ASSIGNOR TO RATCHET BRAKE COMPANY, A CORPORATION OF NEW YORK.

RATCHET-BRAKE MECHANISM.

Application filed May 5, 1922. Serial No. 558,606.

*To all whom it may concern:*

Be it known that I, ROBERT H. BLACKALL, a citizen of the United States, residing at Pittsburgh, in the county of Allegheny, State of Pennsylvania, have invented certain new and useful Improvements in Ratchet-Brake Mechanisms; and I do hereby declare the following to be a full, clear, and exact description of the invention, such as will enable others skilled in the art to which it appertains to make and use the same.

My invention is an improvement in ratchet brake mechanisms, and relates particularly to hand actuated mechanisms, wherein the oscillatory movement of an operating lever or handle is, through the medium of suitable clutch mechanism, converted into a brake-applying movement of the brake-staff. In devices of this character, gravity, or some form of releasing mechanism for the brakes, as for instance springs, is relied upon to rotate the brake-staff in the reverse direction, the said mechanism acting upon the chain to unwind the same. In practice, however, it frequently happens that the chain does not unwind freely and the device will stick and fail to release properly, because the turns of the chain on the staff become wedged or entangled one in another, become jammed against the brake-staff support or other parts of the car, or the staff binds in the end sill. In such case, the brake shoes will remain in contact with the wheels leaving the brakes set or dragging. Because of this it is desirable to provide means permitting the staff to be positively turned in the reverse direction. In the usual construction, a spring supported cap is provided, which may be depressed manually, to connect the brake-staff and lever, so that by means of the lever, the staff may be rotated in the reverse direction. To operate the cap, it is necessary that the operator hold the cap depressed during the reverse rotation of the brake-staff. In the present invention I provide means whereby the staff may be clutched or coupled to the lever to be rotated forwardly to set the brakes, or rearwardly to positively release the brakes, by moving said lever longitudinally of the staff, the lever being moved in one direction to couple it to the staff to set the brakes, and in the opposite direction to couple it to the staff to release the brakes.

In the drawings—

Figure 1 is a side view of the mechanism in position to operate the brakes, and with the parts in one position, Figure 2 is a similar view with the parts in another position, Figure 3 is a top plan view, Figure 4 is a section on the line 4—4 of Figure 3, Figure 5 is a front view with the parts in release or neutral position, Figure 6 is a similar view with the parts in brake releasing position, Figures 7 and 8 are sections on the lines 7—7 and 8—8 respectively, of Figure 4.

In the present embodiment of the invention, the brake-staff 1 is provided near its top, with a fixed clutch section 2, secured thereto by means of a pin 3, extending diametrical to the staff, and engaging the section. The fixed clutch has teeth 4 on its upper face, as shown, which are adapted to cooperate with similar teeth 5 on a movable section 6, which is connected to the operating lever 7 for the brake, in a manner to be presently described. The movable clutch section 6 is in the form of a housing, mounted to move vertically on the staff, and the lever 7 is pivoted thereto by means of a pin 8, in such manner that the lever may swing radially to the staff, or into substantial parallelism therewith.

A cap 9 is secured to the top of the staff, above the housing 6, by means of a cross-pin 10, and the lower edge of this cap carries a series of clutch teeth 11, which face in the opposite direction to the teeth 4 of the fixed clutch section 2. The movable clutch section or housing 6, carries a second set of clutch teeth 12, which are designed to cooperate with the teeth 11, and the teeth 12 face in the opposite direction to the teeth 5. A bracket 13 supports and journals the staff, below the fixed clutch section 2, and this bracket carries oppositely arranged double cams, each consisting of portions 14 and 15. Each of the said portions is in the form of an incline, having at its upper edge a stop 16 and 17, respectively. The housing 6 carries a pair of oppositely arranged cams 18, each of which has a surface inclined in the opposite direction to the cam portions 14 and 15, and designed to cooperate therewith. A stop 19 is provided at the lower end of each cam 18, and each cam is recessed, as indicated at 20, adjacent to the stop, the recess being designed to receive the stop 16. When it is desired to hold the movable clutch section in released position, that is out of engagement with the fixed section 2, the lever is moved to cause the cam surfaces 18 to ride upon the cam surfaces 14 until the recesses 20 engage the stops 16 as shown in Figure 5. The clutch teeth 4 and 5 are now disengaged, and the movable section of the clutch is in neutral position. The lever cannot move further in this direction, the stops 16 and 17 locking the cam 18 between them, to prevent overthrow of the lever, such as might move the cams 18 beyond the cams 14—15. When it is desired to move the movable section into engagement with the fixed section or cap 9, the housing 6 is lifted bodily by hand to engage the teeth 12 with the teeth 11.

In operation, when it is desired to set the brake, the brakeman swings the lever 7 outwardly, and oscillates the same. As the lever moves forwardly, the brake-staff is carried therewith, and as the lever moves rearwardly the teeth 5 slip idly over the teeth 4. A continuation of the oscillating movement will eventually tighten the brakes. When it is desired to release the brake, the staff is moved by means of the lever toward brake tightening position, until the foot or holding pawl for the staff, not shown, but which is usually arranged on the platform, may be released. After loosening the foot pawl, the lever is released. The rotation of the brake-staff carries the lever rearwardly, until the cams 18 strike the cams 14. The cams 18 now ride up the cams 14 until the stops 16 engage the recesses 20. The release of the lever from the staff is automatic when the brake-staff is permitted to rotate under the influence of the release mechanism for the brakes. Should there be sticking of the brake-staff from any cause, it may be "backed-off" by lifting the housing bodily, until the teeth 12 thereof engage the teeth 11 of the cap. When so engaged and held, the brake-staff may be rotated rearwardly, and if necessary to rotate it more than a convenient throw of the lever 7, the lever may be swung about the staff forwardly to engage the clutch or cap 9 at another point. It will be understood that the bracket 13 is secured to a fixed support, as for instance a car body or framing, and the said bracket provides a journal for the staff.

I claim:

1. In a mechanism of the class described, the combination with the brake-staff and the operating lever, of oppositely arranged ratchet-toothed clutch sections fixed to the staff and spaced apart from each other, a movable section between said fixed sections having a set of ratchet teeth on each end and mounted to move to cooperate with the sections in alternation, thereby to move the staff in either direction, and means for oscillating the movable section.

2. In mechanism of the class described, the combination with a brake-staff and the operating lever, of oppositely arranged fixed clutch sections on the staff spaced apart from each other, a section movable on the staff between the fixed sections to cooperate with either thereby to move the staff in either direction, a lever for oscillating the movable section, and means controlled by the swinging of the lever rearwardly beyond a selected point for moving the movable section into inoperative position and for holding it in such position.

3. In mechanism of the class described, the combination with the brake-staff and the operating lever, of upper and lower fixed clutch sections spaced apart from each other, a movable section between the fixed sections, and mounted to move to cooperate with the sections in alternation, thereby to move the staff in either direction, an operating lever hinged to the movable section to swing radially to the staff or into substantial parallelism therewith, and means controlled by rearward swinging of the lever beyond a selected point for moving the movable section out of engagement with the lower fixed section into inoperative position and for holding it in such position.

4. In mechanism of the class described, the combination with the brake-staff, of upper and lower clutch sections secured on the staff in spaced relation one above the other, a movable section between said fixed sections and common to both, said fixed sections being oppositely arranged, and a lever pivoted to the movable section for operating the same, a fixed bracket in which the staff is journaled, said bracket and the movable section having cooperating means for lifting the movable section out of engagement with the lowermost fixed section, and controlled by the rearward swinging of the lever.

In testimony whereof I affix my signature.

ROBERT H. BLACKALL.